(12) United States Patent
Chen et al.

(10) Patent No.: US 7,587,275 B2
(45) Date of Patent: Sep. 8, 2009

(54) VEHICLE NAVIGATION CONTROL SYSTEM AND METHOD

(75) Inventors: Kuo-Rong Chen, Panchiao (TW); Chun-Chung Lee, Taipei (TW); Ming-Wen Yang, Sinjhuang (TW)

(73) Assignee: Sin Etke Technology Co., Ltd, Taipei (TW)

( * ) Notice: Subject to any disclaimer, the term of this patent is extended or adjusted under 35 U.S.C. 154(b) by 244 days.

(21) Appl. No.: 11/652,057

(22) Filed: Jan. 11, 2007

(65) Prior Publication Data

US 2009/0177355 A1    Jul. 9, 2009

(30) Foreign Application Priority Data

Nov. 6, 2006    (TW) .............................. 95140938 A (51) Int. Cl.
*G01C 21/30*    (2006.01)

(52) U.S. Cl. ................ 701/208; 701/206; 701/211; 340/992; 342/357.01; 342/357.1

(58) Field of Classification Search ............... 701/1, 701/200, 208, 210–212, 215, 206; 340/988, 340/991, 992, 994; 342/357.01, 357.06, 342/357.09, 357.1
See application file for complete search history.

(56) References Cited

U.S. PATENT DOCUMENTS

2002/0138180 A1 *  9/2002  Hessing et al. ................ 701/1
2006/0111837 A1 *  5/2006  Tauchi ........................ 701/210

* cited by examiner

*Primary Examiner*—Gertrude Arthur Jeanglaud
(74) *Attorney, Agent, or Firm*—Bacon & Thomas PLLC (57) ABSTRACT

A vehicle navigation control system and method in which the system includes a communication bus, a navigation system, a display device, and a vehicle control computer. The navigation system is connected to the communication bus to provide navigation information. The display device displays a human machine interface and one item of prompt information. The vehicle control computer controls vehicle devices of the vehicle by means of the human machine interface displayed on the display device, fetches the navigation information from the navigation system via the communication bus, converts the fetched navigation information into an item of prompt information, and outputs the converted prompt information to the display device for display during display of the human machine interface.

16 Claims, 7 Drawing Sheets

VEHICLE NAVIGATION CONTROL SYSTEM AND METHOD

BACKGROUND OF THE INVENTION

1. Field of the Invention

The present invention relates to the vehicle navigation technology and more particularly, to a vehicle navigation control system and method.

2. Description of Related Art

Following fast development of electronic technology, a vehicle can easily be equipped with a vehicle control computer to control the vehicle's peripheral devices. The vehicle control computer of a vehicle not only controls the operation of the air-conditioner, sliding sunroof, headlights, and/or other peripheral devices of the vehicle, but also provides multimedia audio/video output by means of a display screen, hence increasing the added value of the vehicle.

In recent years, GPS (Global Positioning System) has been intensively used in vehicles to provide current position and a navigation function.

Because a vehicle control computer needs to control vehicle peripheral devices, it is generally integrated in a vehicle. Further, a GPS is commonly installed in a vehicle for use as a handheld device.

Figure 1:
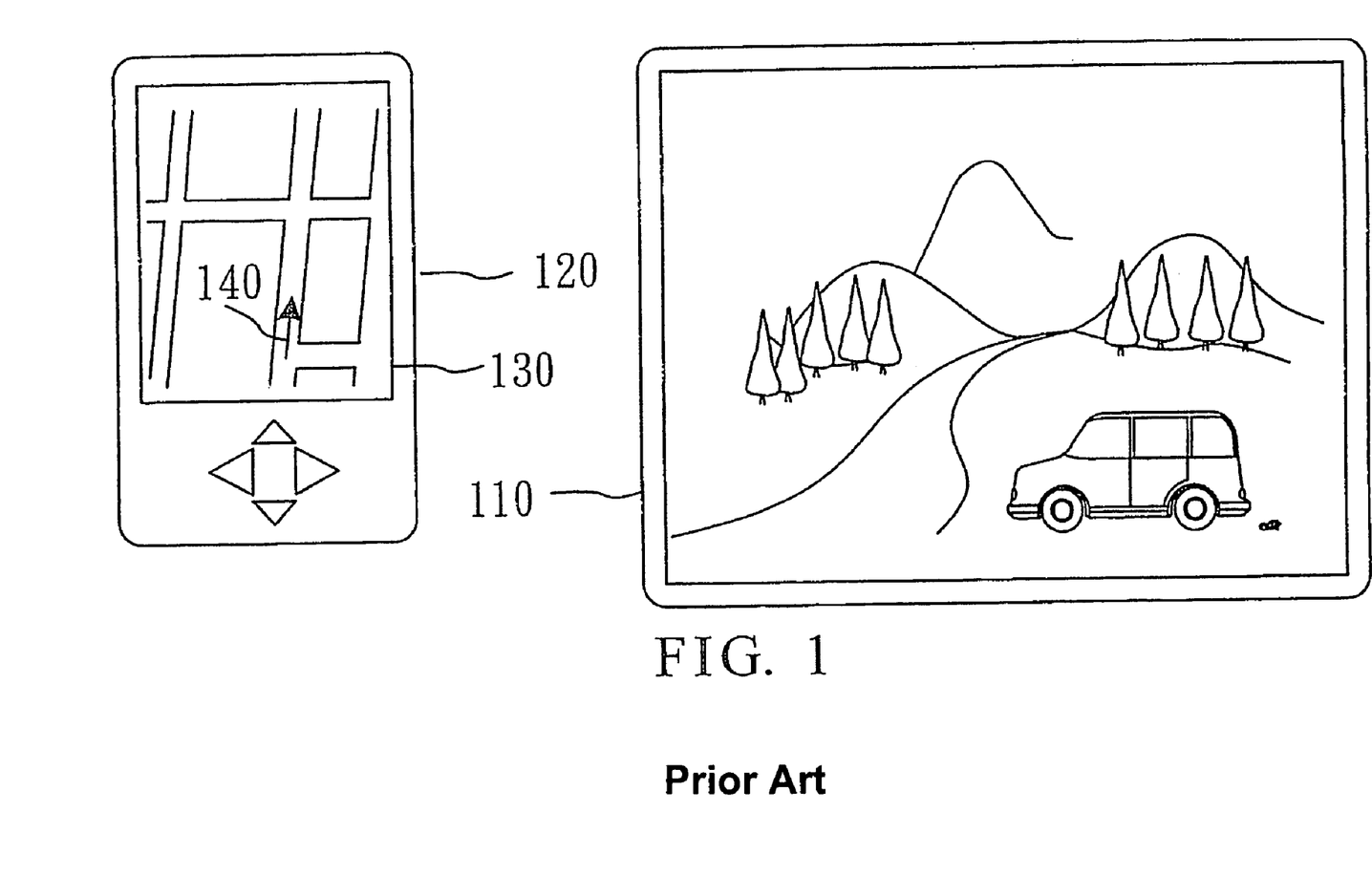
FIG. 1 is schematic drawing showing the application of a vehicle control computer and a GPS according to the prior art.

FIG. 1 is schematic drawing showing the application of a vehicle control computer and a GPS according to the prior art. As illustrated, the screen 130 of the GPS 120 displays the navigation status of a vehicle sign 140 while the display screen 110 of the vehicle control computer is displaying a video film. However, because a handheld navigation device is not fitted with a speed measuring line and a gyrotheodolite, it is inferior to a vehicle navigation system in positioning accuracy. Further, the handheld navigation device tends to be taken away by a thief. Further, the installed power cable and bracket destruct the internal beauty of the vehicle.

A vehicle navigation system overcomes the drawbacks of a handheld navigation device. However, because a vehicle's vehicle control computer and vehicle navigation system use a common display screen the owner of the vehicle can only select the vehicle control device or the vehicle navigation system at a time. Trouble occurs when a passenger wishes to watch a video film and the driver of the vehicle has to use the vehicle navigation system to guide traveling of the vehicle.

Therefore, there is still a room for improvement on the functioning of a conventional vehicle control computer and a global positioning system.

SUMMARY OF THE INVENTION

The present invention has been accomplished under the circumstances in view. It is therefore the main object of the present invention to provide a vehicle navigation control system, which integrates a vehicle control system and a navigation system.

It is another object of the present invention to provide a vehicle navigation control system, which integrates a vehicle control system and a navigation system for allowing one single display device to provide versatile information.

According to one aspect of the present invention, the invention provides a vehicle navigation control system, which comprises a communication bus, a navigation system, a display device, and a vehicle control computer. The navigation system is electrically connected to the communication bus, and adapted to provide at least one item of navigation information. The display device is adapted to display a human machine interface and at least one item of prompt information. The vehicle control computer is installed in a vehicle and electrically connected to the communication bus and the display device. The vehicle control computer controls at least one vehicle device of the vehicle by means of the human machine interface displayed on the display device. Further, the vehicle control computer fetches the at least one item of navigation information from the navigation system via the communication bus, converts the fetched at least one item of navigation information into the at least one item of prompt information and outputs the at least one item of prompt information to the display device for display during display of the human machine interface.

According to another aspect of the present invention, the invention provides a vehicle navigation control method, which is to display at least one item of navigation information produced by a navigation system on the image of a human machine interface on a display device of a vehicle control computer. The navigation system is electrically connected to the vehicle control computer through a communication bus. The navigation system comprises a global positioning system, and an electronic map database. The electronic map database has stored therein multiple road map data, and the information of multiple points of interest. The vehicle navigation control method comprises the steps of (a) the global positioning system produces a global position coordinate data of the vehicle; (b) the navigation system fetching the multiple road map data and the information of points of interest subject to the global position coordinate data so as to produce the at least one item of navigation information, the at least one item of navigation information including the global position coordinate data produced by the global positioning system and at least one specific point of interest spaced from the global position coordinate data at a predetermined specific range, the information of at least one point of interest being the information of the points of interest within the predetermined specific range from the global position coordinate data searched from the electronic map database by the navigation system; (c) the navigation system transmits the at least one item of navigation information to the vehicle control computer through the communication bus, so that the vehicle control computer converts the at least one item of navigation information into at least one item of prompt information; and (d) the vehicle control computer displays the human machine interface and the at least one item of prompt information on the display device.

According to another embodiment of the present invention, the vehicle navigation control method is to display at least one item of navigation information produced by a navigation system on a display device of a vehicle control computer. The navigation system is electrically connected to the vehicle control computer through a communication bus. The navigation system comprises a global positioning system, and an electronic map database. The electronic map database has stored therein multiple road map data and the information of multiple points of interest. The vehicle navigation control method comprises the steps of (a) the global positioning system receives multiple satellite signals to produce a global position coordinate data of the vehicle; (b) input a destination position, and search the multiple road map data from the electronic map database subject to the destination and the global position coordinate data, and then calculate an optimal guide path, wherein the optimal path includes the coordinates of multiple turning points and their corresponding guide information; (c) transmit at least one item of navigation information to the vehicle control computer through the communication bus to produce at least one item of prompt information, wherein the at least one navigation information includes a next turning point and the corresponding guide information of the next turning point; the at least one item of prompt information includes the next turning point and the corresponding guide information of the next turning point; and (d) display the at least one item of prompt information on the display device.

DETAILED DESCRIPTION OF THE PREFERRED EMBODIMENT

Figure 2:
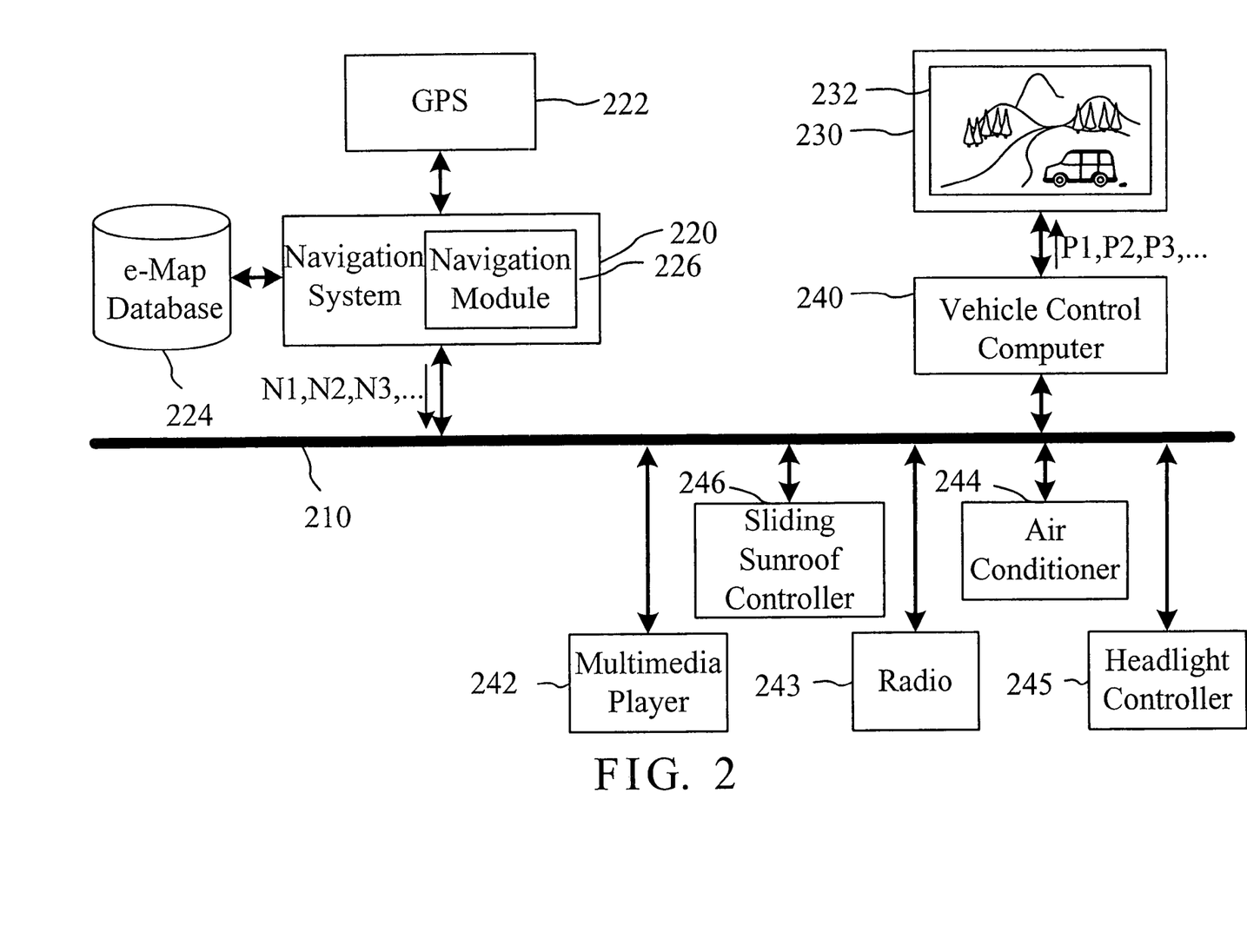
FIG. 2 is a system block diagram of a vehicle navigation control system according to the present invention.

FIG. 2 is a system block diagram of a vehicle navigation control system according to the present invention. As illustrated, the vehicle navigation control system comprises a communication bus 210, a navigation system 220, a display device 230, and a vehicle control computer 240.

The communication bus 210 is a CAN (Car Area Network) bus. The navigation system 220 is electrically connected to the communication bus 210 to provide at least one item of navigation information N1,N2,N3 . . .

The display device 230 is adapted to display a HMI (Human Machine Interface) 232 and at least one item of prompt information P1,P2,P3 . . . at a same time.

The vehicle control computer 240 is electrically connected to the communication bus 210 and the display device 230, and adapted to control at least one vehicle device of a vehicle by means of the HMI 232 displayed on the display device 230. The at least one vehicle device can be the vehicle's air conditioner 244, multimedia player 242, radio 243, headlight controller 245, and/or sliding sunroof controller 246.

The vehicle control computer 240 fetches the at least one item of navigation information N1,N2,N3 . . . from the navigation system 220 through the communication bus 210, and converts the navigation information N1,N2,N3 . . . into corresponding at least one item of prompt information P1,P2, P3 . . . and outputs the at least one item of prompt information P1,P2,P3 . . . to the display device 230 for display.

The navigation system 220 comprises a GPS (Global Positioning System) 222, an electronic map database 224, and a navigation module 226.

The GPS 222 receives multiple satellite signals to provide GPS coordinate data Pc of the vehicle. The electronic map database 224 has stored therein multiple road map data and the information of multiple POI (Points of Interest). The road map data includes names of multiple roads and the coordinates of the start point and end point of each of the roads. The information of POI includes coordinates of installation locations of speed enforcement cameras and the corresponding description information, coordinates of roads and the corresponding speed limit information, and coordinates of points of interest and the corresponding description information.

In other embodiments, the navigation system 220 uses the received multiple satellite data and the multiple road map data from the electronic map database 224 to perform precision position matching and to further produce the aforesaid GPS coordinate data Pc, thereby enhancing the accuracy of the navigation system 220.

The at least one item of navigation information N1,N2, N3 . . . of the navigation system 220 includes the GPS coordinate data Pc produced by the GPS 222 and the information of at least one POI (Point of Interest) within a specific range R from the GPS coordinate data Pc. The information of at least one POI (Point of Interest) means the information of the points of interest within the said specific range R from the GPS coordinate data Pc searched from the electronic map database 224 by the navigation system 220.

The navigation module 226 searches the said multiple road map data from the electronic map database 224 subject to a target position Pd and the GPS coordinate data Pc for calculating an optimal guide path, wherein the optimal guide path includes coordinates of multiple turn points and the corresponding guide information. The guide information includes turn indicator information, the name of a turning road, and the range between the GPS coordinate data Pc and the turning point.

The vehicle may not move along the optimal guide path due to change of traffic jam conditions, i.e., the optimal guide path shall have to be re-calculated subject to change of traffic jam conditions. Therefore, it is not necessary to transmit the optimal guide path containing the said coordinates of multiple turn points and their corresponding guide information to the vehicle control computer 240. According to this embodiment, the turn point closest to the GPS coordinate data Pc is defined to be the next turn point, and the coordinates of the next turn point and its corresponding guide information are transmitted to the vehicle control computer 240. Thus, the at least one item of navigation information N1,N2,N3 . . . further includes the guide information corresponding to the next turn point. The at least one item of prompt information P1,P2, P3 . . . further includes the guide information corresponding to the next turn point.

The vehicle control computer 240 converts the at least one item of navigation information N1,N2,N3 . . . into the at least one item of prompt information P1,P2,P3 . . . , and outputs the at least one item of prompt information P1,P2,P3 . . . to the display device 230 for display. The display device 230 overlaps the at least one item of prompt information P1,P2, P3 . . . , upon the image of the HMI 232. In other embodiments, the display device 230 displays the at least one item of prompt information P1,P2,P3 . . . on an OSD (On-Screen Display) thereof.

Figure 3:
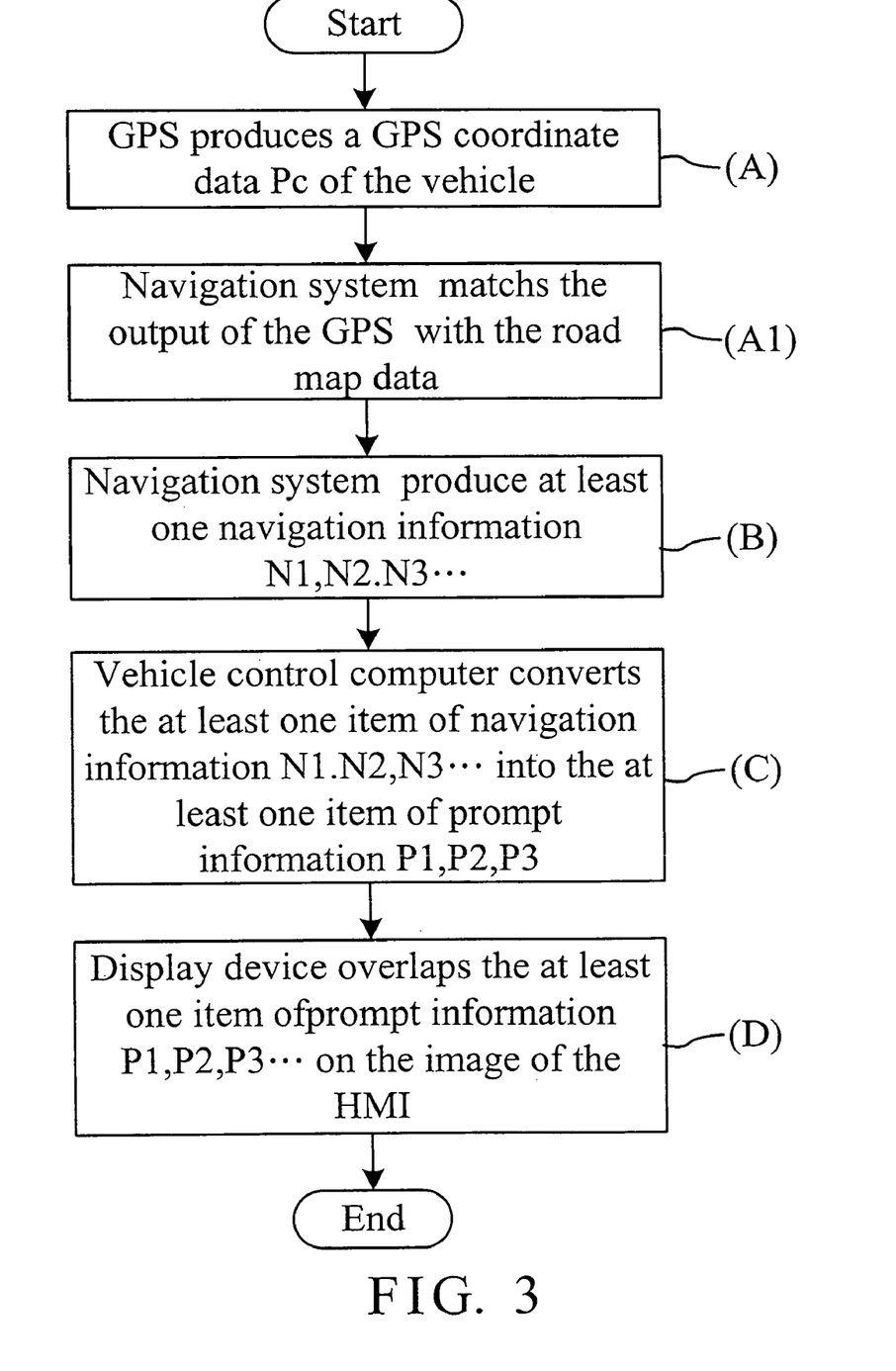
FIG. 3 is a flow chart of the vehicle navigation control method according to the present invention.

FIG. 3 is a flow chart of the vehicle navigation control method according to the present invention. This method is to have at least one item of navigation information N1,N2, N3 . . . produced by a navigation system 220 be displayed on a display device 230 that has the image of a HMI (Human Machine Interface) 232. The navigation system 220 is coupled to a vehicle control computer 240 through a communication bus 210. The communication bus 210 is a CAN (Car Area Network) bus. The navigation system 220 comprises a GPS 222 and an electronic map database 224. The electronic map database 224 has stored therein multiple road map data and the information of multiple POI (Points of Interest). The road map data includes the names of multiple roads and the coordinates of the start point and end point of each of the roads. The multiple POI includes coordinates of speed enforcement cameras and their corresponding description information, coordinates of roads and their corresponding speed limit information, and coordinates of points of interest and their corresponding description information.

First, in step (A), the GPS 222 receives multiple satellite signals to produce a GPS coordinate data Pc of the vehicle. To enhance the accuracy of the GPS coordinate data Pc, step (A) further includes a sub step (A1), in which the navigation system 220 performs a matching process to produce the GPS coordinate data Pc by matching the output of the GPS 222 with the road map data stored in the electronic map database 224.

In step (B), the navigation system 220 fetches the multiple road map data and the information of multiple POI (Points of Interest) from the electronic map database 224 subject to the GPS coordinate data Pc to produce the at least one item of navigation information N1,N2,N3 . . . . The at least one item of navigation information N1,N2,N3 . . . includes the GPS coordinate data Pc produced by the GPS 222 and the at least one item of specific POI spaced from the GPS coordinate data Pc at a specific range R. The information of the at least one POI (Point of Interest) means the information of the points of interest within the said specific range R from the GPS coordinate data Pc searched from the electronic map database 224 by the navigation system 220.

In step (C), the navigation system 220 transmits the at least one item of navigation information N1,N2,N3 . . . to the vehicle control computer through the communication bus. The vehicle control computer converts the at least one item of navigation information N1,N2,N3 . . . into the at least one item of prompt information P1,P2,P3 . . . .

In step (D), the vehicle control computer 240 displays the image of the HMI (Human Machine Interface) and the at least one item of prompt information P1,P2,P3 . . . on the display device 230. The display device 230 overlaps the at least one item of prompt information P1,P2,P3 . . . on the image of the HMI.

Figure 4:
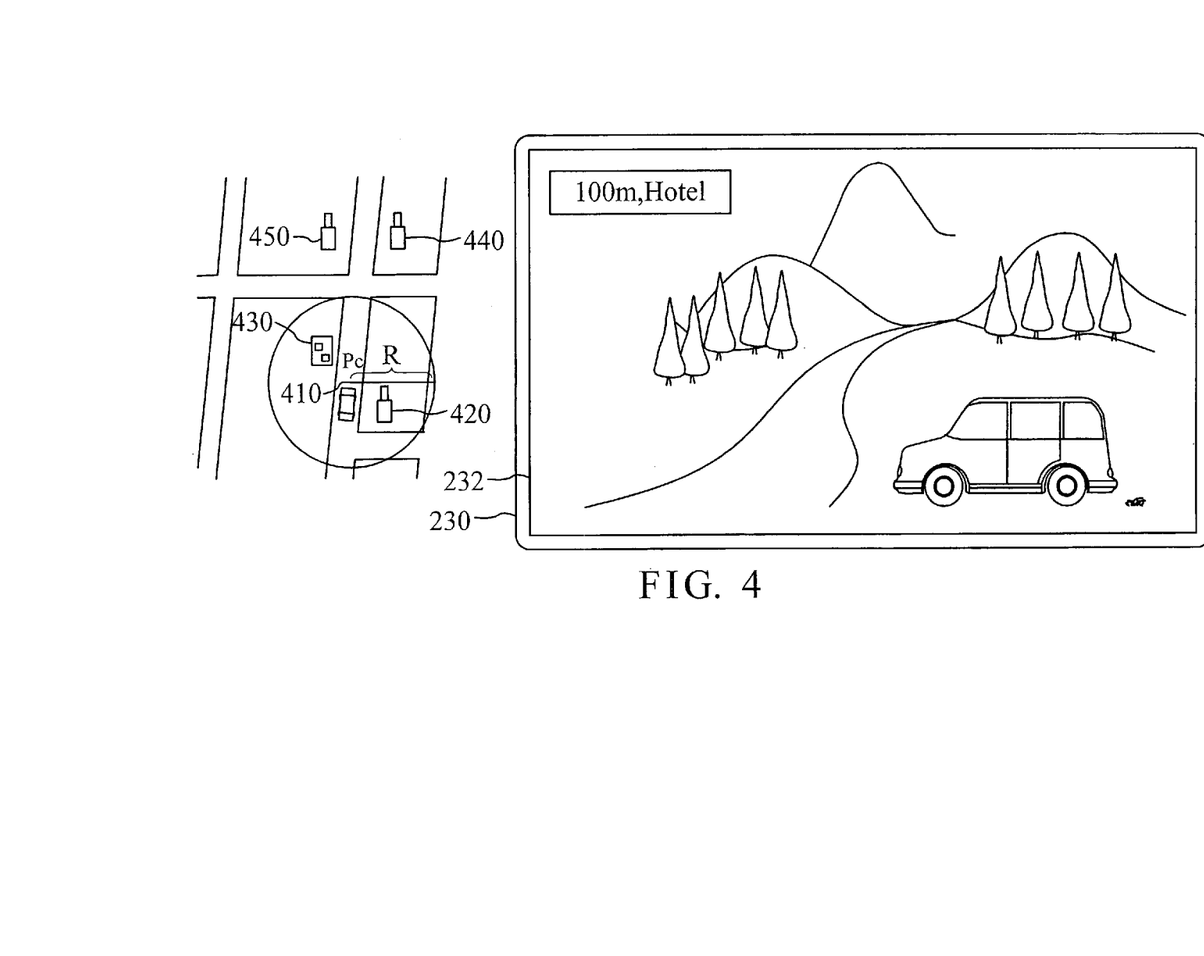
FIG. 4 is a schematic drawing showing a status of use of the vehicle navigation control method according to the present invention.

FIG. 4 is a schematic drawing showing a status of use of the vehicle navigation control method according to the present invention. As shown in FIG. 4, the display device 230 plays a video film by means of the HMI 232. The reference sign 410 represents the location of the vehicle. The navigation system 220 searches the information of the multiple points of interest 420,430,440,450 in the electronic map database 224 to find out the points of interest 420,430 that are within the specific range R from the GPS coordinate data Pc. The vehicle control computer 240 converts the at least one item of navigation information N1,N2,N3 . . . of the points of interest 420,430 into the at least one item of prompt information, and overlaps the at least one item of prompt information on the image of the HMI 232.

Figure 5:
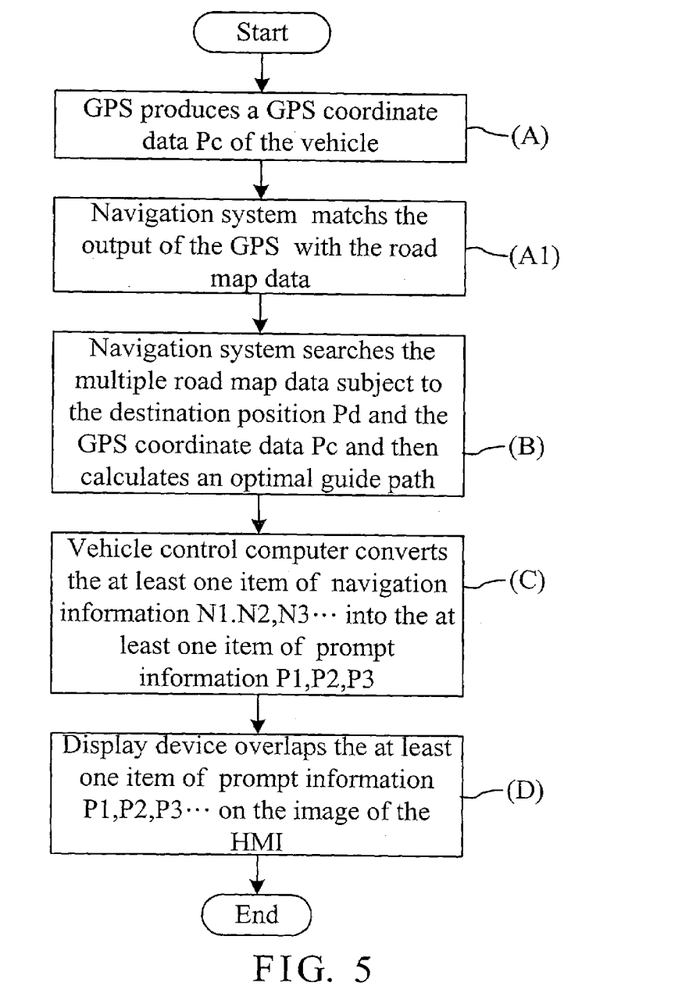
FIG. 5 is a flow chart of an alternative form of the vehicle navigation control method according to the present invention.

FIG. 5 is a flow chart of an alternative form of the vehicle navigation control method according to the present invention. According to this embodiment, the at least one item of navigation information N1,N2,N3 . . . produced by the navigation system 220 is displayed on the display device 230 of a vehicle control computer 240. The navigation system 220 is electrically connected to the vehicle control computer through a communication bus 240, which is a CAN (Car Area Network) bus.

The navigation system 220 comprises a GPS 222 and an electronic map database 224. The electronic map database 224 has stored therein multiple road map data and the information of multiple points of interest. The road map data includes names of multiple roads and the coordinates of the start point and end point of each of the roads. The information of multiple points of interest includes coordinates of installation locations of speed enforcement cameras and the corresponding description information, coordinates of roads and their corresponding speed limit information, and coordinates of points of interest and their corresponding description information.

First, in step (A), the GPS 222 receives multiple satellite signals to produce a GPS coordinate data Pc of the vehicle. To enhance the accuracy of the GPS coordinate data Pc, step (A) further includes a sub step (A1), in which the navigation system 220 performs a road matching to produce the GPS coordinate data Pc subject to the output of the GPS 222 and the electronic map database 224.

Figure 6:
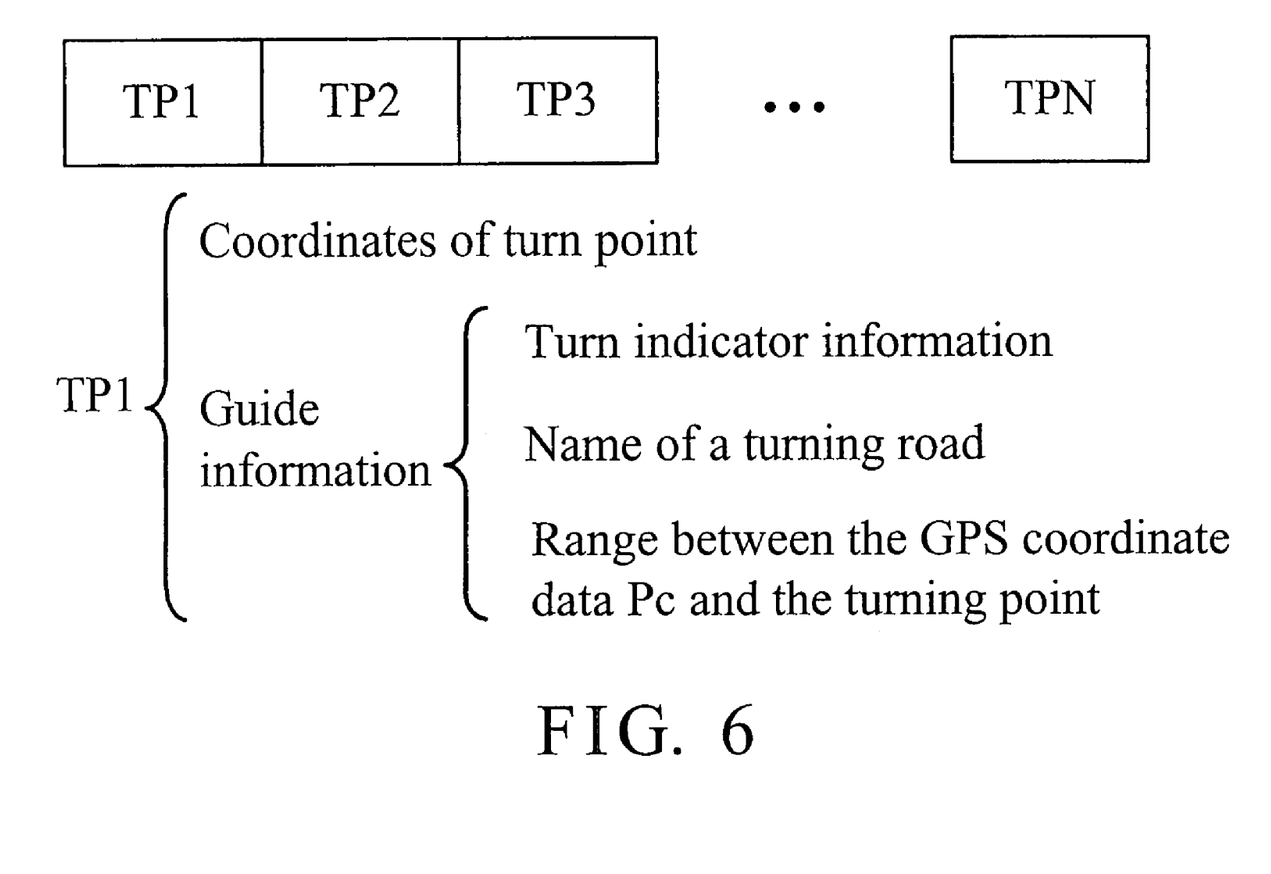
FIG. 6 is a schematic drawing showing the data structure of the optimal guide path according to the present invention.

In step (B), a destination position Pd is input so that the navigation system 220 searches the multiple road map data from the electronic map database 124 subject to the destination position Pd and the GPS coordinate data Pc and then calculates an optimal guide path. FIG. 6 is a schematic drawing showing the data structure of the optimal guide path according to the present invention. As shown in FIG. 6, the optimal guide path consists of the turn points 1~N (TP1~TPN) that are stored in an array. FIG. 6 simply shows the data structure of the turn point 1(TP1), i.e., the optimal path contains the coordinates of multiple turn points and their corresponding guide information. The guide information includes turn indicator information, the name of a turning road, and the range between the GPS coordinate data Pc and the turning point. Because traffic jam conditions may change, the vehicle may not move along the optimal guide path, i.e., the optimal guide path shall have to be re-calculated subject to change of traffic jam conditions. Therefore, it is not necessary to transmit the optimal guide path containing the said coordinates of multiple turn points and their corresponding guide information to the vehicle control computer 240. According to this embodiment, the turn point closest to the GPS coordinate data Pc is defined to be the next turn point, and the coordinates of the next turn point and its corresponding guide information are transmitted to the vehicle control computer 240. Thus, the at least one item of navigation information N1,N2,N3 . . . further includes the guide information corresponding to the next turn point. The at least one item of prompt information P1,P2,P3 . . . further includes the guide information corresponding to the next turn point.

In step (C), the at least one item of navigation information N1,N2,N3 . . . is transmitted to the vehicle control computer 240 through the communication bus 210 to produce at least one item of prompt information P1,P2,P3 . . . , in which the at least one item of navigation information N1,N2,N3 . . . includes the guide information of the next turn point; the at least one item of prompt information P1,P2,P3 . . . includes the guide information of the next turn point.

In step (D), the at least one item of prompt information P1,P2,P3 . . . is shown on the display device 230. The display device 230 overlaps the at least one item of prompt information P1,P2,P3 . . . on the image of the HMI (Human Machine Interface).

Figure 7:
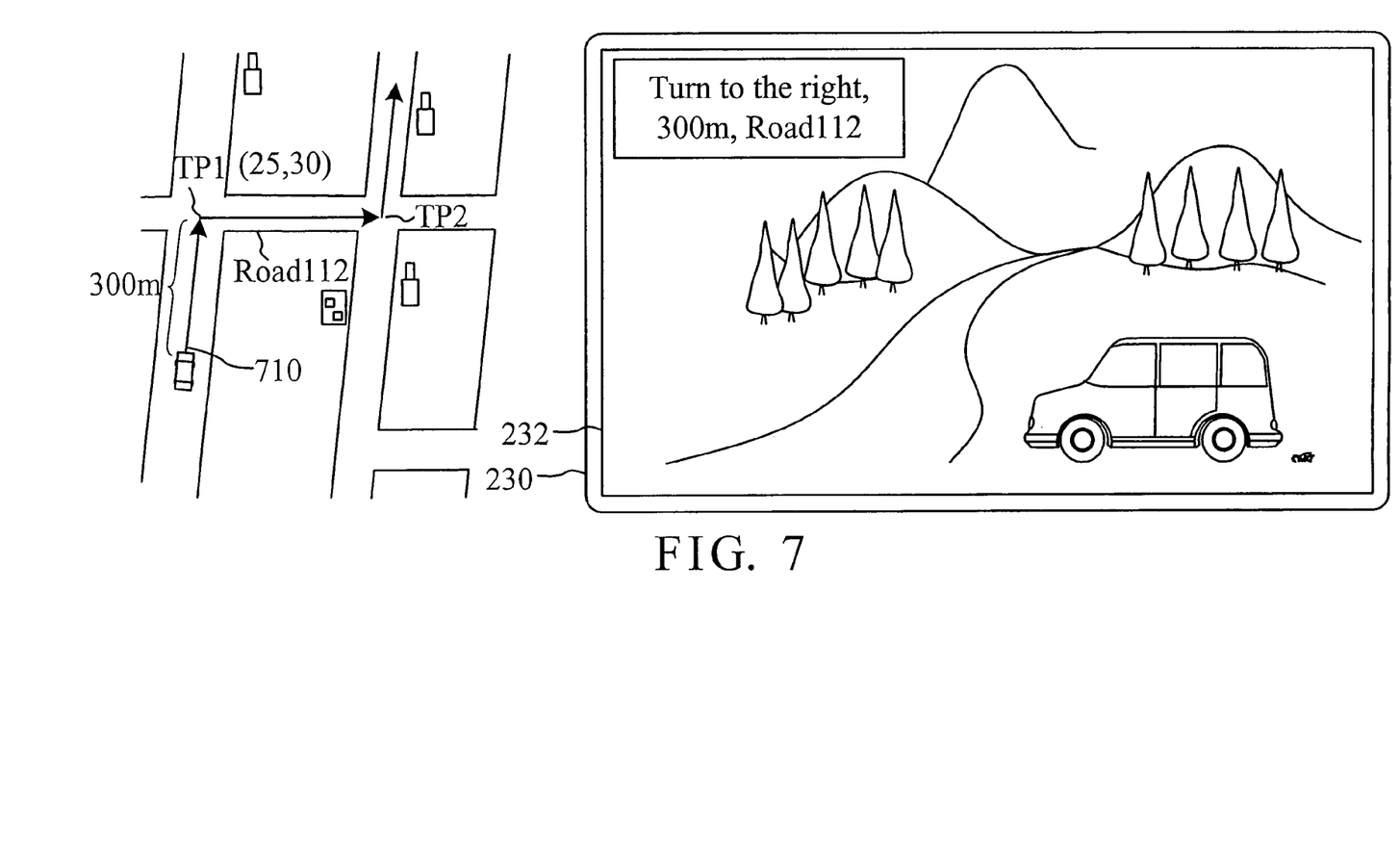
FIG. 7 is a schematic drawing showing a status of use of the alternative form of the vehicle navigation control method according to the present invention.

FIG. 7 is a schematic drawing showing a status of use of the alternative form of the vehicle navigation control method according to the present invention. As shown in FIG. 7, the display device 230 plays a video film by means of the HMI 232. In FIG. 7, the reference sign 710 represents the location of the vehicle. The navigation system 220 searches the multiple road map data in the electronic map database 224 subject to the destination position Pd and the GPS coordinate data Pc, and then calculates an optimal guide path subject to the searched data. The optimal guide path consists of the turn points 1~N(TP1~TPN). The vehicle is at 300 meters away from the turning point 1(TP1), and shall have to turn to the right. The name of the turning road is Road 112. The vehicle control computer 240 converts the at least one item of navigation information N1,N2,N3 . . . containing the turning point 1 into the at least one item of prompt information, and overlaps the at least one item of prompt information on the image of the HMI 232.

As stated above, unlike the conventional technique to use two display screens for browsing of navigation guide information and a video film, the invention allows browsing of a video film and navigation guide information to be simultaneously show on a single display screen. Therefore, the invention enhances the convenience of use, avoids driver distraction, and integrates the vehicle control device and the navigation system.

Although the present invention has been explained in relation to its preferred embodiment, it is to be understood that many other possible modifications and variations can be made without departing from the spirit and scope of the invention as hereinafter claimed.

What is claimed is:

1. A vehicle navigation control system comprising:
   a communication bus;
   a navigation system electrically connected to said communication bus and adapted to provide at least one item of navigation information;
   a display device adapted to display a human machine interface and at least one item of prompt information;
   a vehicle control computer installed in a vehicle and electrically connected to said communication bus and said display device, said vehicle control computer controlling at least one vehicle device of said vehicle by means of the human machine interface displayed on said display device, said vehicle control computer fetching said at least one item of navigation information from said navigation system via said communication bus and converting the fetched at least one item of navigation information into the at least one item of prompt information and outputting the converted the at least one item of prompt information to said display device for display during display of said human machine interface;
   a global positioning system adapted to produce a global position coordinate data of said vehicle;
   an electronic map database, said electronic map database having stored therein multiple road map data and the information of multiple points of interest;
   wherein said information of multiple points of interest includes the coordinates of the installation locations of multiple speed enforcement cameras and their corresponding description information, the coordinates of roads and their corresponding speed limit information, and the coordinates of points of interest and their corresponding description information; and
   said at least one item of navigation information includes the global position coordinate data produced by said global positioning system and information of at least one specific point of interest within a specific range from said global position coordinate data, said information of at least one specific point of interest being the information of the points of interest within a specific range from said global position coordinate data obtained by said navigation system by searching the information of multiple points of interest in said electronic map database.

2. The vehicle navigation control system as claimed in claim 1, wherein said multiple road map data includes the names of multiple roads and the coordinates of the start point and the end point of each of the roads.

3. The vehicle navigation control system as claimed in claim 1, wherein said navigation system further comprises a navigation module, said navigation module searching the multiple road map data in said electronic map database subject to a destination location and said global position coordinate data and calculating an optimal guide path subject to the searched road map data.

4. The vehicle navigation control system as claimed in claim 3, wherein said optimal guide path includes the coordinates of multiple turning points and their corresponding guide information.

5. The vehicle navigation control system as claimed in claim 4, wherein said guide information includes turn indicator information, the name of a turning road, and the range between said global position coordinate data and said turning point.

6. The vehicle navigation control system as claimed in claim 4, wherein said at least one navigation information further includes guide information of a next turning point, and said at least one item of prompt information contains said guide information of said next turning point.

7. The vehicle navigation control system as claimed in claim 1, wherein said at least one vehicle device includes an air-conditioner of said vehicle.

8. The vehicle navigation control system as claimed in claim 1, wherein said at least one vehicle device includes a multimedia player of said vehicle.

9. The vehicle navigation control system as claimed in claim 1, wherein said communication bus is a car area network bus.

10. The vehicle navigation control system as claimed in claim 1, wherein said display device is adapted to overlap said at least one item of prompt information upon the image of said human machine interface.

11. The vehicle navigation control system as claimed in claim 1, wherein said display device is adapted to display said at least one item of prompt information by means of an on-screen display.

12. The vehicle navigation control system as claimed in claim 1, wherein said navigation system produces the global coordinate data of said vehicle by means accurately matching the received multiple satellite data with the multiple road map data in said electronic map database.

13. A vehicle navigation control method for displaying at least one item of navigation information produced by a navigation system on the image of a human machine interface on a display device of a vehicle control computer, said navigation system being electrically connected to said vehicle control computer through a communication bus, said navigation system comprising a global positioning system and an electronic map database, said electronic map database having stored therein multiple road map data and the information of multiple points of interest, the vehicle navigation control method comprising the steps of:
   (a) said global positioning system produces a global position coordinate data of said vehicle;
   (b) said navigation system fetching said multiple road map data and said information of points of interest subject to said global position coordinate data so as to produce said at least one item of navigation information, said at least one item of navigation information including said global position coordinate data produced by said global positioning system and at least one specific point of interest spaced from said global position coordinate data at a predetermined specific range, said information of at least one point of interest being the information of the points of interest within said predetermined specific range from said global position coordinate data searched from said electronic map database by said navigation system;

(c) said navigation system transmits said at least one navigation information to said vehicle control computer through said communication bus, so that said vehicle control computer converts said at least one item of navigation information into at least one item of prompt information; and (d) said vehicle control computer displays said human machine interface and said at least one item of prompt information on said display device.

14. The vehicle navigation control method as claimed in claim 13, wherein said step (a) comprises a sub step (a1) in which said navigation system matches the output data of said global positioning system with the multiple road map data stored in said electronic map database to produce said global position coordinate data.

15. The vehicle navigation control method as claimed in claim 13, wherein said display device overlaps said at least one item of prompt information upon the image of said human machine interface.

16. The vehicle navigation control method as claimed in claim 13, wherein said communication bus is a car rear network bus.

* * * * *